(12) United States Patent
Huang et al.

(10) Patent No.: US 11,761,887 B2
(45) Date of Patent: Sep. 19, 2023

(54) APPARATUS AND METHOD FOR QUANTITATIVE DETECTION OF GASES

(71) Applicant: NATIONAL INSTITUTE OF METROLOGY, CHINA, Beijing (CN)

(72) Inventors: Zejian Huang, Beijing (CN); Xiang Fang, Beijing (CN); Xinhua Dai, Beijing (CN); You Jiang, Beijing (CN)

(73) Assignee: NATIONAL INSTITUTE OF METROLOGY, CHINA

( * ) Notice: Subject to any disclaimer, the term of this patent is extended or adjusted under 35 U.S.C. 154(b) by 103 days.

(21) Appl. No.: 17/418,223

(22) PCT Filed: Apr. 23, 2020

(86) PCT No.: PCT/CN2020/086388
§ 371 (c)(1),
(2) Date: Jun. 24, 2021

(87) PCT Pub. No.: WO2021/128668
PCT Pub. Date: Jul. 1, 2021

(65) Prior Publication Data
US 2022/0307972 A1    Sep. 29, 2022

(30) Foreign Application Priority Data
Feb. 4, 2020  (CN) .......................... 202010079921.7

(51) Int. Cl.
*G01N 21/31* (2006.01)
*G01N 27/62* (2021.01)
(Continued)

(52) U.S. Cl.
CPC ................ *G01N 21/31* (2013.01); *G01J 3/42* (2013.01); *G01N 27/62* (2013.01); *H01J 49/26* (2013.01);
(Continued)

(58) Field of Classification Search
CPC ........ G01N 21/31; G01N 27/62; G01N 21/39; G01N 23/225; G01N 2021/391; G01J 3/00; H01J 49/00
(Continued)

(56) References Cited

U.S. PATENT DOCUMENTS 4,517,461 A * 5/1985 Crandall .......... G01N 2030/025
250/281
5,900,532 A * 5/1999 Ikeda ..................... G01N 1/405
96/108
(Continued)

FOREIGN PATENT DOCUMENTS

CN   203798783 U  *  8/2014
CN   104458603 A     3/2015
(Continued)

OTHER PUBLICATIONS

Dorit Munzke, Michael Böhm, and Oliver Reich, "Gaseous Oxygen Detection Using Hollow-Core Fiber-Based Linear Cavity Ring-Down Spectroscopy," Optica Publishing Group, J. Lightwave Technol. 33, 2524-2529 (Year: 2015).*

(Continued)

*Primary Examiner* — Michelle M Iacoletti
*Assistant Examiner* — Noah J. Haney
(74) *Attorney, Agent, or Firm* — Dickinson Wright PLLC (57) ABSTRACT

An apparatus and a method for quantitative detection of gases are provided. The apparatus for quantitative detection of gases includes: a cavity ring-down spectroscopy device configured to quantitatively detect any characteristic gas in gases to be detected; a sample processing device disposed in a downstream of the cavity ring-down spectroscopy device and connected to the cavity ring-down spectroscopy device; and a mass spectrometry device disposed in a downstream of the sample processing device and configured to detect all the (Continued)

gases to be detected. Quantitative analysis of any variety of gases may be achieved without using standard gas in the technical solution proposed by the present application. Since no standard gas is required, the technology has significantly increased flexibility, and can be used for routine laboratory testing, for online analysis at industrial sites, as well as detection and analysis in environmental protection, national defense, aviation, aerospace, military and other fields.

11 Claims, 4 Drawing Sheets

(51) Int. Cl.
*H01J 49/26* (2006.01)
*G01J 3/42* (2006.01)
*G01N 21/39* (2006.01)

(52) U.S. Cl.
CPC ....... *G01N 21/39* (2013.01); *G01N 2021/391* (2013.01)

(58) Field of Classification Search
USPC .......................................................... 356/72
See application file for complete search history.

(56) References Cited

U.S. PATENT DOCUMENTS

| | | | | |
|---|---|---|---|---|
| 2008/0123712 | A1* | 5/2008 | Zhou | G01N 21/39 |
| | | | | 372/55 |
| 2009/0120212 | A1* | 5/2009 | Hargrove | G01N 33/0037 |
| | | | | 73/863.11 |
| 2012/0133942 | A1* | 5/2012 | Lonigro | G01N 1/22 |
| | | | | 73/864.81 |
| 2012/0223223 | A1* | 9/2012 | Sugiyama | H01J 49/0045 |
| | | | | 250/288 |
| 2012/0241622 | A1 | 9/2012 | Heyne et al. | |
| 2012/0298868 | A1* | 11/2012 | Massick | G01N 21/39 |
| | | | | 250/339.13 |
| 2013/0068100 | A1* | 3/2013 | Mondello | G01N 30/6039 |
| | | | | 96/104 |
| 2014/0339413 | A1* | 11/2014 | Wortelmann | G01N 33/497 |
| | | | | 250/281 |
| 2016/0011101 | A1 | 1/2016 | Ognibene et al. | |
| 2018/0301328 | A1* | 10/2018 | Yu | H01J 49/165 |

FOREIGN PATENT DOCUMENTS

| | | | |
|---|---|---|---|
| CN | 105181851 | A | 12/2015 |
| CN | 105974023 | A | 9/2016 |
| CN | 106169411 | A | 11/2016 |
| CN | 106290247 | A * | 1/2017 |
| CN | 106596439 | A | 4/2017 |
| CN | 107340341 | A | 11/2017 |
| CN | 109001155 | A | 12/2018 |
| CN | 209542203 | U * | 10/2019 |
| CN | 110411960 | A | 11/2019 |
| EP | 0185926 | A2 * | 7/1986 |
| WO | WO-2013070954 | A1 * | 5/2013 |
| WO | WO-2015199870 | A1 * | 12/2015 |
| WO | 2016010680 | A1 | 1/2016 |

OTHER PUBLICATIONS

Li-Wu et al., "A Method for Combining a Stable Isotope Mass Spectrometer with an Isotopic Spectroscope to Analyze the 17O/16O," Rock and Mineral Analysis, Jun. 2013, pp. 392-397, vol. 32, No. 3, China Academic Journal Electronic Publishing House.

Stacewicz et al., "Cavity Ring-Down Spectroscopy coupled with helium microwave induced plasma for fluorine detection," Spectrochimica Acta Part B, 2010, pp. 306-310, Elsevier B.V., Poland.

Yuwei, "Cavity Ring Down Spectroscopy Technology And Its Application in Analysis of Trace Gas," Low Temperature and Specialty Gases, Feb. 2011, pp. 5-7, vol. 29, No. 1, China.

International Search Report for PCT/CN2019/086388 with English Translation dated Nov. 9, 2020, pp. 1-8.

* cited by examiner

APPARATUS AND METHOD FOR QUANTITATIVE DETECTION OF GASES

CROSS-REFERENCE TO RELATED APPLICATION

The present application is a national phase application of International Application No. PCT/CN2020/086388, filed on Apr. 23, 2020, which claims priority to Chinese patent application No. 202010079921.7 filed on Feb. 4, 2020, entitled "Apparatus and Method for Quantitative Detection of Gases," the disclosure of which is hereby incorporated by reference in its entirety.

FIELD OF TECHNOLOGY

The present application relates to the field of gas detection, in particular to an apparatus and a method for quantitative detection of gases.

BACKGROUND

With the continuous development of industry, more and more gases are discharged into the ambient air, and many gases will have impacts on human production and life, typically such as indoor decoration pollution, atmospheric pollution and so on. As a result, the need for gas detection is becoming increasingly widespread and quantification is important for gas detection.

Traditional quantitative detection methods of gases include colorimetry, electrochemistry, chromatography, mass spectrometry, chromatography-mass spectrometry, cavity ring-down spectroscopy, etc., such as GB/T 8984-2008 "Determination of carbon monoxide, carbon dioxide and hydrocarbon in gases—Gas chromatographic method", HJ759-2015 "Ambient air-Determination of volatile organic compounds—Collected by specially-prepared canisters and analyzed by gas chromatography/mass spectrometry", GB/T 5832.3-2011 "Determination of moisture in gases—Part 3: The method of Cavity Ring-Down Spectroscopy". Generally, high-accuracy spectroscopy methods such as gas chromatography, gas chromatography/mass spectrometry, and cavity ring-down spectroscopy are usually used for detecting of the content of trace gas.

Gas chromatography is a chromatographic separation analysis method that uses gas as a mobile phase, in which a certain volume of gas sample is brought into a chromatographic column by a carrier gas (mobile phase). The stationary phase in the column has different molecular acting forces against the components in the gas sample, and the time for each component to flow out of the chromatographic column is different, thus the components are separated from each other. The standard gas of each single component is detected in advance, and the time it takes to flow out of the chromatographic column, which is called the retention time, is obtained, and qualitative analysis in the gas chromatograph is performed by means of the retention time. The external standard method and internal standard method are usually used for quantitative analysis in gas chromatography, and when an injection volume may be accurate, the external standard method is usually adopted for quantification. In this method, it is first necessary to obtain standard gases with different concentrations of one gas component, and then detect the standard gas with each concentration separately, so as to calculate a quantitative calibration curve for the gas based on a series of concentrations. After the actual sample is analyzed, corresponding component chromatographic peaks are calculated according to the quantitative calibration curves of different substances to achieve quantification. For the internal standard method, an appropriate substance is selected as the reference substance of a predicted component and quantitatively added to the sample, and quantitative detection is performed based on the added amount of the reference substance and the ratio of response values (peak areas or peak heights) of the component to be determined and the reference substance on the detector.

In gas chromatography/mass spectrometry, gas chromatography is used to separate gas samples, and then mass spectrometry is used for qualitative and quantitative analysis. Since the substances are separated by the chromatography method, the components separated from the chromatographic column are pure substances when being detected by mass spectrometry, and there is no interference from other substances. Therefore, components may be qualitatively analyzed using the standard library of mass spectrometry. The quantitative method of gas chromatography/mass spectrometry is the same as that of gas chromatography.

In the cavity ring-down spectroscopy, the characteristic absorption spectrum of the gas in the cavity can be obtained by measuring the cavity ring-down time at a specific wavelength, thereby accurately measuring the gas concentration. Since it is to measure the ring-down time during which the laser penetrates the optical cavity, instead of the light intensity change of the laser after penetrating the optical cavity, the measurement result is not affected by the fluctuation of the laser light source. In addition, the high-reflectivity optical resonant cavity greatly increases the effective absorption length, which makes the measurement sensitivity significantly higher than that of traditional absorption spectroscopy techniques. Moreover, in the cavity ring-down spectroscopy under certain conditions, the concentration of the detected gas is only related to the ring-down time, therefore, the cavity ring-down spectroscopy does not need to be compared with external standards.

However, there are also some shortcomings in the prior art. In the detection process of gas chromatography, the qualitative analysis relies on the retention time of the chromatographic peak. Therefore, it is necessary to detect each substance respectively in advance to establish a qualitative retention timetable. Once the chromatographic conditions (such as temperature, pressure, chromatographic column's length, chromatographic column's model, etc.) change, the qualitative retention timetable needs to be re-established. The quantification by the external standard method of gas chromatography relies on a quantitative curve, and a series of standard gases are required to be equipped, which is time-consuming, labor-intensive, and uneconomical. For the internal standard method, it is necessary to select a substance having a retention time without overlapping with that of the analyte, and the concentration difference between the substance and the analyte should not be too large. Therefore, it is often more difficult to select the internal standard.

With gas chromatography/mass spectrometry, the qualitative analysis is carried out by mass spectrometry. Since qualitative analysis by the mass spectrometry relies on standard spectra, changes in chromatographic conditions will not affect the qualitative analysis of the system. The external standard method and internal standard method are usually used for quantification of gas chromatography/mass spectrometry. The external standard method, like gas chromatography, also requires a series of standard gases. The internal standard method of mass spectrometry differs from gas chromatography in that it is necessary to select a substance with the same physicochemical properties as the object to be measured. The isotope dilution method is usually used, i.e., to select an isotopic standard gas of the gas to be detected, but isotopic standard gases are usually expensive and not all gases may have a corresponding isotopic standard gas.

For the detection of gas concentration by cavity ring-down spectroscopy, only the ring-down time is measured and no standard gas is required, which are advantages of the cavity ring-down method. However, because most laser sources of cavity ring-down spectroscopy are single-wavelength type or cover very narrow bands, one laser source can only be used for the detection of one or a few gases. In order to detect more gases, it is necessary to switch between different laser sources, which greatly increases the complexity and cost of the instrument.

SUMMARY

In view of the defects in the prior art, embodiments of the present application provide an apparatus and a method for quantitative detection of gases, so as to enable quantitative detection and analysis of any variety of gases without using standard gases.

According to a first aspect of the embodiments of the present application, provided is an apparatus for quantitative detection of gases, including: a cavity ring-down spectroscopy device configured to quantitatively detect any characteristic gas in gases to be detected; a sample processing device disposed in a downstream of the cavity ring-down spectroscopy device and connected to the cavity ring-down spectroscopy device; and a mass spectrometry device disposed in a downstream of the sample processing device and configured to detect all the gases to be detected.

According to an embodiment of the present application, the cavity ring-down spectroscopy device includes: an optical cavity provided with a gas inlet and a gas outlet; lenses disposed in the optical cavity and located at opposite ends of the optical cavity; a laser source located outside the optical cavity; and a photodetector located outside the optical cavity; wherein a light beam emitted by the laser source passes through the lenses and the optical cavity, and is received by the photodetector.

According to an embodiment of the present application, the mass spectrometry device includes: a vacuum cavity in which an ion source, a mass analyzer and a detector are disposed, an end of the vacuum cavity being provided with a gas inlet; and a vacuum pump located outside the vacuum cavity and connected to the vacuum cavity.

According to an embodiment of the present application, the ion source is configured to ionize the gas to be detected, the mass analyzer is configured to perform mass analysis on ions generated by ionization, and the detector is configured to output detection results of the mass analysis.

According to an embodiment of the present application, the sample processing device includes: a sample processor connected with a sample tube and a mass spectrometry injection tube, wherein the sample tube also communicates with the gas outlet of the optical cavity, and the mass spectrometry injection tube also communicates with the gas inlet of the vacuum cavity.

According to an embodiment of the present application, the sample processor includes: a three-port valve having a first port communicating with the sample tube and a second port communicating with the mass spectrometry injection tube; and a vacuum sampling pump communicating with a third port of the three-port valve.

According to an embodiment of the present application, the sample processor includes: a multi-way switching valve having a gas inlet communicating with the sample tube and a gas outlet communicating with the mass spectrometry injection tube; and a vacuum sampling pump, a carrier gas device and a quantitative loop respectively communicating with the multi-way switching valve; wherein the multi-way switching valve is switchable between a first state and a second state, in the first state, the quantitative loop communicates with the gas inlet of the multi-way switching valve and the vacuum sampling pump, and in the second state, the quantitative loop communicates with the carrier gas device and the gas outlet of the multi-way switching valve.

According to an embodiment of the present application, in the first state, the gas inlet of the multi-way switching valve, the quantitative loop, and the vacuum sampling pump communicate in sequence, and the carrier gas device communicates with the gas outlet of the multi-way switching valve; and in the second state, the gas inlet of the multi-way switching valve communicates with the vacuum sampling pump, and the carrier gas device, the quantitative loop, and the gas outlet of the multi-way switching valve communicate in sequence.

According to a second aspect of the embodiments of the present application, provided is a method for quantitative detection of gases, including: making gases to be detected flow through a cavity ring-down spectroscopy device, to measure the content of any characteristic gas in the gases to be detected; splitting the gases to be detected to enter a mass spectrometry device by a sample processing device; and using a measured content value of the characteristic gas as an internal standard of the mass spectrometry device to detect the gases to be detected by the mass spectrometry device.

According to an embodiment of the present application, the use of a measured content value of the characteristic gas as an internal standard of the mass spectrometry device to detect the gases to be detected by the mass spectrometry device specifically includes the following steps: calculating content values of other substances in the gases to be detected based on signal intensity ratios of other substances relative to the characteristic gas in a mass spectrum of the mass spectrometry device.

In the apparatus and method for gas quantitative detection provided by the embodiments of the present application, the cavity ring-down spectroscopy device may quantitatively detect any characteristic gas in the gases to be detected, the sample processing device may split the gases to be detected into the mass spectrometry device, and the mass spectrometry device may detect all the gases to be detected. In this way, it is possible to perform quantitative detection and analysis of any variety of gases without using a standard gas. Compared with the prior art, any variety of gases may be quantitatively analyzed without using standard gas in the technical solution proposed by the present application. Since no standard gas is required, the technology has significantly increased flexibility, and can be used not only for routine laboratory testing, but also for online analysis at industrial sites, as well as detection and analysis in environmental protection, national defense, aviation, aerospace, military and other fields.

BRIEF DESCRIPTION OF THE DRAWINGS

In order to more clearly illustrate technical solutions disclosed in the embodiments of the present application or the prior art, drawings needed in the descriptions of the embodiments or the prior art will be briefly described below. Obviously, the drawings in the following description only show certain embodiments of the present application, and other drawings can be obtained according to the drawings without any creative work for those skilled in the art.

Reference Numerals:

| | |
|---|---|
| 100 apparatus for quantitative detection of gases | |
| 102 cavity ring-down spectroscopy device | 104 sample processing device |
| 106 mass spectrometry device | 108 optical cavity |
| 110 lens | 111 laser source |
| 112 photodetector | 114 gas inlet |
| 116 gas outlet | 118 vacuum cavity |
| 120 ion source | 122 mass analyzer |
| 124 detector | 126 gas inlet |
| 128 vacuum pump | 130 sample processor |
| 132 sample tube | |
| 134 mass spectrometry injection tube | 136 three-port valve |
| 138 vacuum sampling pump | 140 multi-way switching valve |
| 142 vacuum sampling pump | 144 carrier gas device |
| 146 quantitative loop | 148 gas inlet |
| 150 gas outlet | |

DETAILED DESCRIPTION

Implementations of the present application are further described in detail below in conjunction with the drawings and embodiments. The following embodiments are intended to illustrate the present application, but are not intended to limit the scope of the present application.

In the description of the embodiments of the present application, it should be noted that the orientation or positional relationships indicated by terms such as "center", "longitudinal", "lateral", "upper", "lower", "front", "rear", "left", "right", "vertical", "horizontal", "top", "bottom", "inside", "outside" are based on the orientation or positional relationship shown in the drawings, and are intended only to facilitate the description of embodiments of the present application and simplify the description, rather than to indicate or imply that a device or component referred to must have a particular orientation, or be constructed and operated in a particular orientation, and thus can not to be construed as limiting the embodiments of the present application. Moreover, the terms "first", "second", "third", and the like are used for descriptive purposes only and are not to be construed as indicating or implying relative importance.

In the description of the embodiments of the present application, it should be noted that unless otherwise clearly specified and defined, the terms "connected with" and "connected" shall be understood broadly, for example, it may be either fixedly connected or detachably connected, or may be integrally connected; it may be mechanically connected, or electrically connected; it may be directly connected, or indirectly connected through an intervening medium. The specific meanings of the terms above in embodiments of the present application can be understood by a person skilled in the art in accordance with specific conditions.

In the embodiments of the present application, unless otherwise clearly specified and defined, the first feature being located "on" or "under" the second feature means that the first feature is in direct contact with the second feature or the first feature is in indirect contact with the second feature via an intervening medium. Also, the first feature being located "on", "above" and "on top of" the second feature may mean that the first feature is directly or diagonally above the second feature, or it simply means that the level of the first feature is higher than that of the second feature. The first feature being located "under", "below" and "on bottom of" the second feature may mean that the first feature is directly or diagonally below the second feature, or it simply means that the level of the first feature is lower than that of the second feature.

In the description of this specification, descriptions with reference to the terms "an embodiment", "some embodiments", "example", "specific example", or "some examples", etc. mean that specific features, structures, materials or characteristics described in conjunction with the embodiment or example are included in at least one embodiment or example of the present application. In this specification, the schematic expressions of the above terms do not necessarily refer to the same embodiment or example. Also, the described specific features, structures, materials or characteristics may be combined in any one or more embodiments or examples in a suitable manner. In addition, those skilled in the art may integrate and combine different embodiments or examples and the features of different embodiments or examples described in this specification without contradicting each other.

Embodiments of the apparatus and the method for gas quantitative detection of the present application will be described with reference to FIGS. 1 to 7. It should be understood that the following descriptions are only exemplary embodiments of the present application, and do not constitute any particular limitation on the present application.

Figure 1:
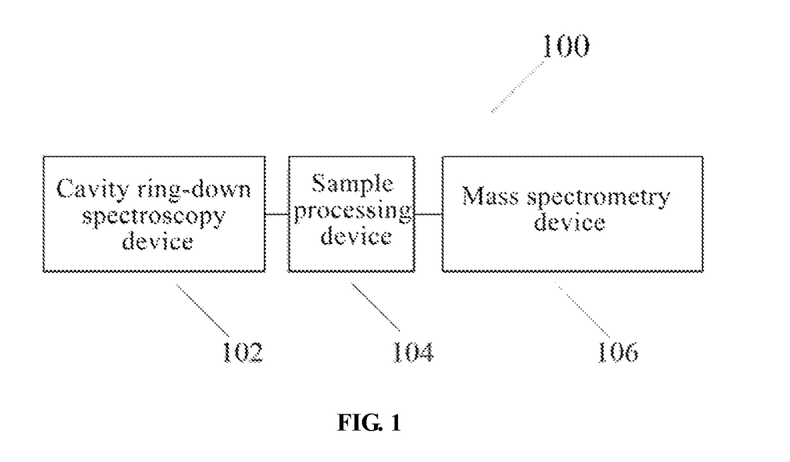
FIG. 1 is a schematic structural diagram of an apparatus for quantitative detection of gases according to an embodiment of the present application.

As shown in FIG. 1, an embodiment of the present application provides an apparatus for quantitative detection of gases 100. Specifically, the apparatus for quantitative detection of gases 100 generally includes a cavity ring-down spectroscopy device 102, a sample processing device 104, and a mass spectrometry device 106; wherein the cavity ring-down spectroscopy device 102 may quantitatively detect any characteristic gas in gases to be detected, the sample processing device 104 is disposed in a downstream of the cavity ring-down spectroscopy device 102 and connected to the cavity ring-down spectroscopy device 102. During use, the gases to be detected may be split into the mass spectrometry device 106 by the sample processing device 104. Further, the mass spectrometry device 106 is disposed in a downstream of the sample processing device 104 and configured to detect all the gases to be detected.

It should be understood that in the embodiment of the present application, the cavity ring-down spectroscopy device and the mass spectrometry device are connected in series. Because the cavity ring-down spectroscopy is a non-destructive detection, the cavity ring-down spectroscopy is disposed ahead of the mass spectrometry. As the gases pass through the optical cavity, the accurate content of the characteristic gas is obtained by measuring the ring-down time, and the content value is used as an internal standard of the mass spectrometry. The gases are split into the mass spectrometry device and detected by the mass spectrometry device. The accurate content values of other substances may be calculated based on signal intensity ratios of other substances relative to the characteristic gas in a mass spectrum.

In this way, it is possible to quantitatively detect and analyze any variety of gases without using standard gas. Compared with the prior art, any variety of gases may be quantitatively analyzed without using standard gas in the technical solution proposed by the present application. Since no standard gas is required, the technology has significantly increased flexibility, and can be used not only for routine laboratory testing, but also for online analysis at industrial sites, as well as detection and analysis in environmental protection, national defense, aviation, aerospace, military and other fields.

Figure 2:
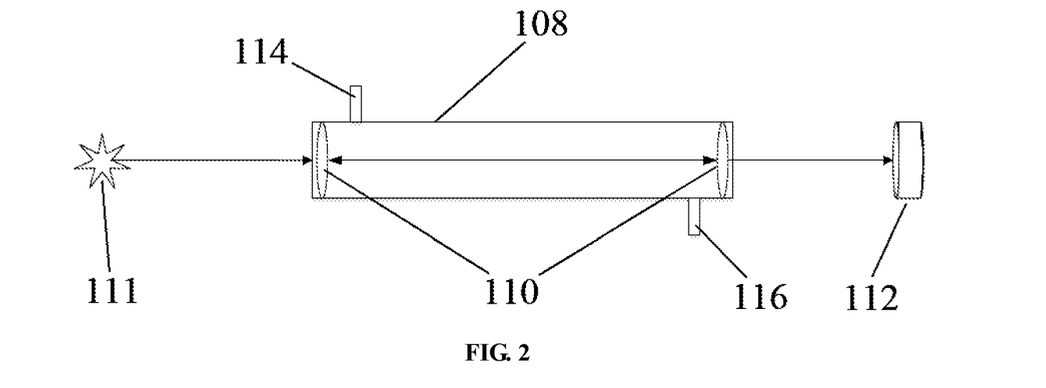
FIG. 2 is a schematic structural diagram of a cavity ring-down spectroscopy device shown in FIG. 1 according to an embodiment of the present application.

Further, as shown in FIG. 2, in an embodiment of the present application, the cavity ring-down spectroscopy device 102 may include an optical cavity 108, lenses 110, a laser source 111 and a photodetector 112. Specifically, a gas inlet 114 and a gas outlet 116 are provided on the optical cavity 108, the lenses 110 may be disposed in the optical cavity 108 and located at opposite ends of the optical cavity 108, and the laser source 111 and the photodetector 112 may be located outside the optical cavity 108. During use, the light beam emitted by the laser source 111 may pass through the lenses 110 and the optical cavity 108 and be received by the photodetector 112.

It should be understood that in the embodiments described herein, "lens" refers to a highly reflective mirror. A small part of the laser light passes through the lens 110 and enters the optical cavity 108, and then reflects back and forth between two lenses 110. For each reflection, a small amount of light passes through the lens 110 and is then detected by the photodetector 112.

Figure 3:
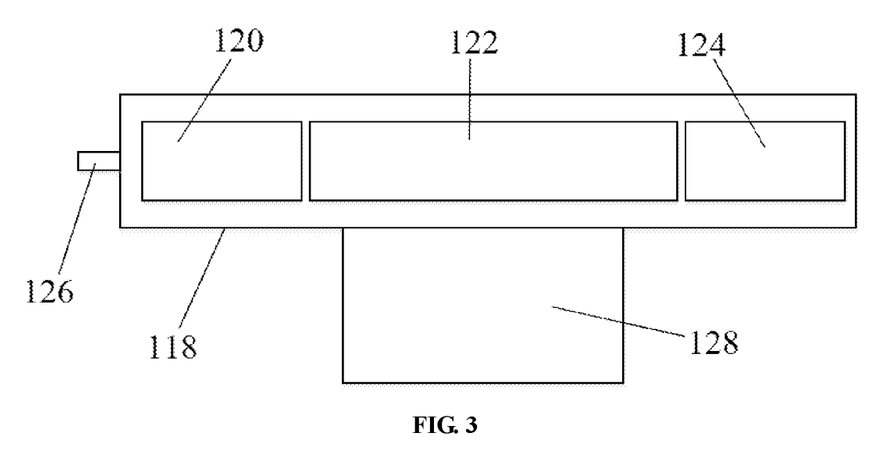
FIG. 3 is a schematic structural diagram of a mass spectrometry device shown in FIG. 1 according to an embodiment of the present application.

Continuing to refer to FIG. 3 and in conjunction with FIG. 1, in an embodiment of the present application, the mass spectrometry device 106 may include a vacuum cavity 118. The vacuum cavity 118 is provided with an ion source 120, a mass analyzer 122 and a detector 124 therein, and is provided with a gas inlet 126 at an end thereof. Specifically, the ion source 120 may be configured to ionize the gas to be detected, the mass analyzer 122 may be configured to perform mass analysis on the ions generated by the ionization, and the detector 124 may be configured to output detection results of the mass analysis.

In addition, the mass spectrometry device 106 further includes a vacuum pump 128, and the vacuum pump 128 may be disposed outside the vacuum cavity 118 and connected to the vacuum cavity 118.

Figure 4:
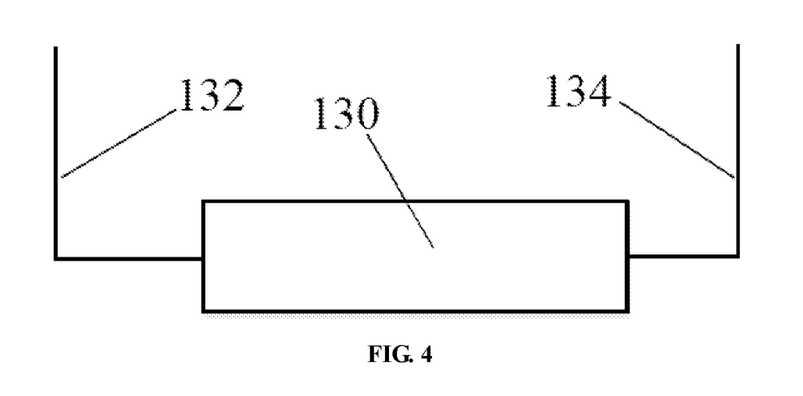
FIG. 4 is a schematic structural diagram of a sample processing device shown in FIG. 1 according to an embodiment of the present application.

As shown in FIG. 4 and in conjunction with FIGS. 1 to 3, in an embodiment of the present application, the sample processing device 104 may include a sample processor 130. Specifically, a sample tube 132 and a mass spectrometry injection tube 134 are connected on the sample processor 130. The sample tube 132 also communicates with the gas outlet 116 of the optical cavity 108, and the mass spectrometry injection tube 134 also communicates with the gas inlet 126 of the vacuum cavity 118.

Figure 5:
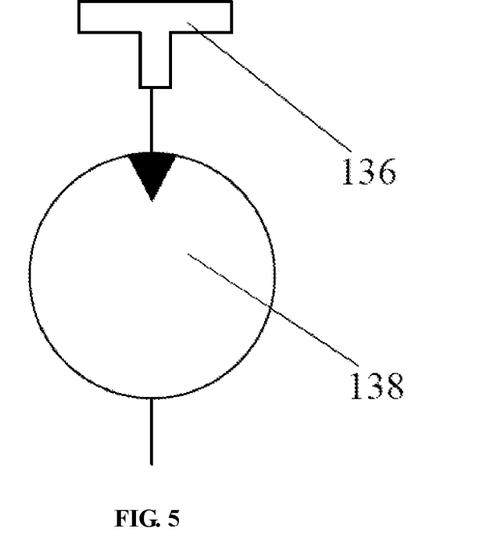
FIG. 5 is a schematic structural diagram of a sample processor shown in FIG. 4 according to an embodiment of the present application.
Figure 6:
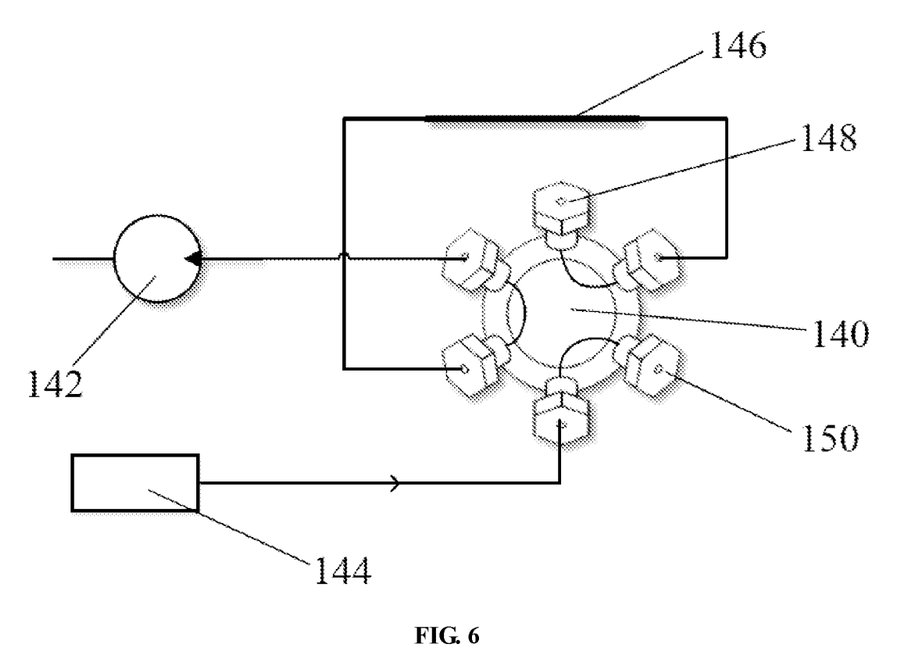
FIG. 6 and FIG. 7 are schematic structural diagrams of the sample processor shown in FIG. 4 according to another embodiment of the present application, where the sample processor is in a first state and a second state, respectively.
Figure 7:
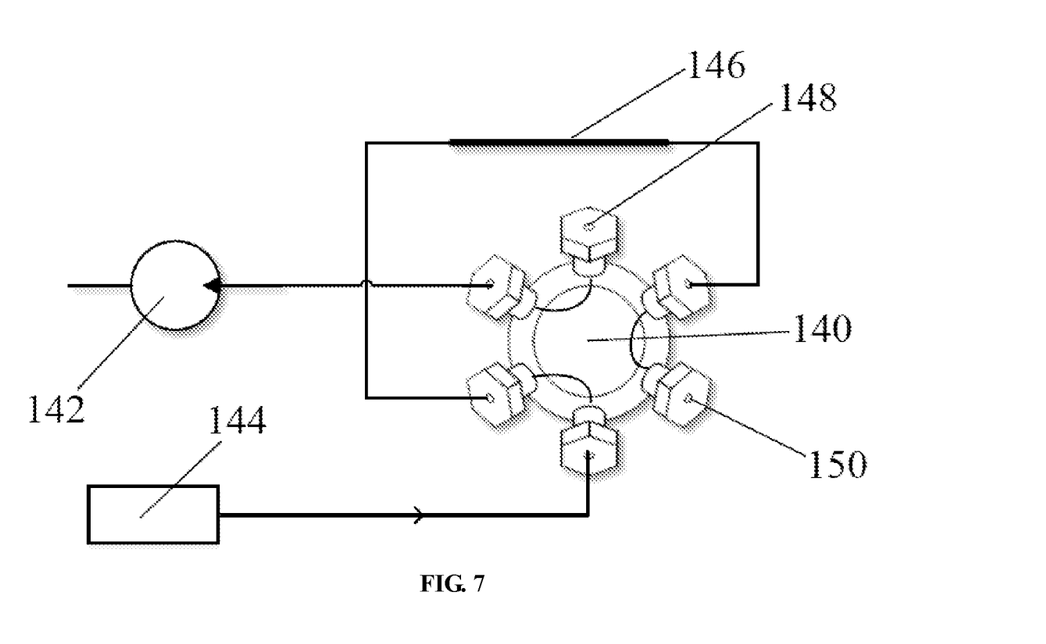

Referring to FIGS. 5 to 7, embodiments of the present application provide two alternative implementations of the sample processor 130, where FIG. 5 shows one of the implementations, and FIGS. 6 and 7 show another implementation. It should be understood, however, that what is described below and as shown in the figures are only schematic implementations of the present application and do not constitute any limitation on the present application.

Referring first to FIG. 5, in this embodiment, the sample processor 130 may include a three-port valve 136 and a vacuum sampling pump 138. Specifically, a first port of the three-port valve 136 communicates with the sample tube 132, a second port communicates with the mass spectrometry injection tube 134, and the vacuum sampling pump 138 communicates with a third port of the three-port valve 136.

While in an embodiment shown in FIGS. 6 and 7, the sample processor 130 may include a multi-way switching valve 140, a vacuum sampling pump 142, a carrier gas device 144 and a quantitative loop 146.

Specifically, the multi-way switching valve 140 has a gas inlet 148 communicating with the sample tube 132 and a gas outlet 150 communicating with the mass spectrometry injection tube 134. The vacuum sampling pump 142, the carrier gas device 144, and the quantitative loop 146 may communicate with the multi-way switching valve 140, respectively.

In the actual operation process, the multi-way switching valve 140 may be switchable between a first state (FIG. 6) and a second state (FIG. 7). Where in the first state, the quantitative loop 146 communicates with the gas inlet 148 of the multi-way switching valve 140 and the vacuum sampling pump 142; and in the second state, the quantitative loop 146 communicates with the carrier gas device 144 and the gas outlet 150 of the multi-way switching valve 140. In other words, in the first state, the gas inlet 148 of the multi-way switching valve 140, the quantitative loop 146, and the vacuum sampling pump 142 communicate in sequence, and the carrier gas device 144 communicates with the gas outlet 150 of the multi-way switching valve 140; and in the second state, the gas inlet 148 of the multi-way switching valve 140 communicates with the vacuum sampling pump 142, and the carrier gas device 144, the quantitative loop 146, and the gas outlet 150 of the multi-way switching valve 140 communicate in sequence.

On the other hand, an embodiment of the present application also provides a method for quantitative detection of gases. Specifically, the method includes the following steps:

making gases to be detected flow through a cavity ring-down spectroscopy device, to measure the content of any characteristic gas in the gases to be detected;

splitting the gases to be detected to enter a mass spectrometry device by a sample processing device; and using a measured content value of the characteristic gas as an internal standard of the mass spectrometry device to detect the gases to be detected by the mass spectrometry device.

More specifically, the using a measured content value of the characteristic gas as an internal standard of the mass spectrometry device to detect the gases to be detected by the mass spectrometry device may specifically include:

calculating content values of other substances in the gases to be detected based on signal intensity ratios of other substances relative to the characteristic gas in a mass spectrum of the mass spectrometry device.

Hereinafter, the operation process of the present application will be described in more detail by way of embodiments. It should be understood that the following exemplary implementations of the present application do not constitute any limitation on the present application.

It should be pointed out here that the detection object in the embodiments of the present application is gas, and the purpose of detection is to achieve accurate quantification of the gases. The quantification mentioned here refers to the concentration content of the gas, rather than the absolute mass.

In the actual operation process, the apparatus and method provided by the present application can be directly applied on site, such as to measure the gas content in an open environment. The sample tube 132 is hermetically connected with the gas outlet 116 of the optical cavity 108, and the mass spectrometry injection tube 134 is hermetically connected with the gas inlet 126 of the vacuum cavity 118.

First, the vacuum sampling pump 138 or 142 in the sample processor 130 is activated to start collecting the ambient gas to be detected. The ambient gas to be detected enters the optical cavity 108 from the gas inlet 114, and flows out from the gas outlet 116, then enters the sample tube 132, and is discharged by the vacuum sampling pump 138 or 142. According to the volume of the optical cavity 108 and the pumping speed of the vacuum sampling pump 138 or 142, the minimum time required to exhaust the original volume of gas in the optical cavity 108 is calculated, and the actual sampling time should be greater than the minimum time.

In an embodiment shown in FIG. 5, the ratios of the peak heights of the ion signals with different mass-to-charge ratios to the peak height of the reference ion signal on a single mass spectrum are used for quantification. The first port of the three-port valve 136 is hermetically connected to the sample tube 132, the second port is hermetically connected to the gas inlet 126 of the vacuum cavity by the mass spectrometry injection tube 134, and the third port is connected to the vacuum sampling pump 138. After the original gas in the optical cavity 108 is replaced completely, the vacuum sampling pump 138 is kept at an on state to maintain sampling. Due to the action of the vacuum pump 128, there is a high vacuum state in the vacuum cavity 118, with a vacuum of better than 1.0 E–6 Torr. Therefore, in addition to most of the gas pumped away by the vacuum sampling pump 138, a small part of the gas continues to flow along the mass spectrometry injection tube 134 through the three-port valve 136, and then enters the vacuum cavity 118 from the gas inlet 126. In the vacuum cavity 118, the gas is ionized by the ion source 120, and the ions generated by the ionization are detected and output by the detector 124 after being subjected to the mass analysis by the mass analyzer 122. The output of the detector 124 is a mass spectrum, in which the horizontal axis represents the mass number and the vertical axis represents the intensity. When the soft ionization method is used, the analyzed substance M may have only one ion, such as molecular ion $M^+$, or $(M+H)^+$ ion, after being ionized by the ion source 120. Therefore, the substance may be qualitatively determined by the one ion, and its intensity may be quantified.

In an embodiment shown in FIG. 6 and FIG. 7, the ratios of the time integrated intensities of ion signals with different mass-to-charge ratios obtained by ionization of a certain volume of gas to the time integrated intensity of the reference ion signal are used for quantification. The sample tube 132 is hermetically connected with the gas inlet 148, and the gas outlet 150 is hermetically connected with the gas inlet 126 via the mass spectrometry injection tube 134. After the original gas in the optical cavity 108 is replaced completely, the vacuum sampling pump 142 is kept at an on state to maintain sampling. Therefore, the gas enters the gas inlet 148 from the sample tube 132, then passes through the quantitative loop 146, and is discharged by the vacuum sampling pump 142; when the quantitative loop 146 is filled with the gas to be detected, the multi-way switching valve 140 is switched to an injecting state (as shown in FIG. 7). At this time, a positive pressure gas in the carrier gas device 144 blows the gas in the quantitative loop 146 into the vacuum cavity 118 through the gas outlet 150 and the gas inlet 126. The gas is then ionized by the ion source 120, and the ions generated by the ionization are detected and output by the detector 124 after being subjected to the mass analysis by the mass analyzer 122. The ion obtained by ionizing the substance to be detected by the ion source 120 is integrated according to time, to obtain the peak area of the ion. In order to simplify the quantitative measurement process, the ion source 120 adopts a soft ionization method, and each substance M to be analyzed obtains one ion, such as molecular ion $M^+$, or $(M+H)^+$ ion.

Assuming that the gas to be detected contains N kinds of substances, among which substance A is used as a reference, each of the remaining substances has a relative ratio to substance A; where the ratio is a peak height ratio when the embodiment shown in FIG. 5 is applied, and is a peak area ratio when the embodiment shown in FIG. 6 and FIG. 7 is applied. Then the content of the corresponding substance may be obtained by multiplying the ratio by the content of substance A. Substance A is equivalent to an internal standard, which is normally an artificial addition and has a known content. In the present application, however, substance A is not artificially added and its content is not known in advance, instead, the content is directly measured by cavity ring-down spectroscopy during operation.

The cavity ring-down spectroscopy may accurately measure the content of substance A without a reference substance, thus only a non-interfering characteristic absorption spectral line of substance A needs to be selected for measurement. For example, $CO_2$ is selected as substance A, and the characteristic absorption spectral line 6218.088505 $cm^{-1}$ is selected, with a spectral line intensity being $1.500 \times 10^{-23}$ $cm^{-1}/(molec \cdot cm^2)$. The laser wavelength corresponding to the characteristic absorption spectral line is selected, and then the cavity ring-down time is measured, thus the content of substance A may be calculated. The accurate contents of the remaining substances can be obtained by multiplying the content value by the relative ratio values measured by mass spectrometry.

In summary, in the present application, the broad-spectrum characteristics of mass spectrometry are fully utilized, and through the cavity ring-down method, it is possible to accurately quantify a specific substance without standard gas. The combination of the mass spectrometry and the cavity ring-down method enables the accurate quantification of any variety of gases without using standard gas.

The cavity ring-down spectroscopy is used to quantitatively detect a characteristic gas in the gases to be detected, such as $CO_2$ (the air usually contains hundreds of ppm of $CO_2$). The mass spectrometry is used to detect all the gases to be detected, including $CO_2$. The content of $CO_2$ is based on the content measured by the cavity ring-down spectroscopy, and then the quantitative results of other substances can be obtained according to the peak heights or areas of other substances relative to $CO_2$.

Therefore, compared with the prior art, any variety of gases may be quantitatively analyzed without using standard gas in the technical solution proposed by the present application. Since no standard gas is required, the technology offers a significant increase in flexibility, and can be used not only for routine laboratory testing, but also for online analysis at industrial sites, as well as detection and analysis in environmental protection, national defense, aviation, aerospace, military and other fields.

Finally, it should be noted that the embodiments above are only used to illustrate the technical solutions of the present application, but not to limit them. Although the present application has been described in detail with reference to the embodiments, those of ordinary skill in the art should understand that they can still modify the technical solutions described in the foregoing embodiments, or make equivalent substitutions to some of the technical features therein; and these modifications or substitutions do not cause the essence of the corresponding technical solutions to deviate from the spirit and scope of the technical solutions of the embodiments of the present application.

What is claimed is:

1. An apparatus for quantitative detection of gases, comprising:
    a cavity ring-down spectroscopy device configured to determine a first content of a particular gas in a plurality of gases;
    a sample processing device disposed downstream of the cavity ring-down spectroscopy device and connected to the cavity ring-down spectroscopy device; and
    a mass spectrometry device disposed downstream of the sample processing device and configured to:
        determine a ratio of respective ion signals of a different gas of the plurality of gases and the particular gas; and
        determine a second content of the different gas using the first content and the ratio.

2. The apparatus for quantitative detection of gases of claim 1, wherein the cavity ring-down spectroscopy device comprises:
    an optical cavity provided with a gas inlet and a gas outlet;
    lenses disposed in the optical cavity and located at opposite ends of the optical cavity;
    a laser source located outside the optical cavity; and
    a photodetector located outside the optical cavity;
    wherein a light beam emitted by the laser source passes through the lenses and the optical cavity, and is received by the photodetector.

3. The apparatus for quantitative detection of gases of claim 2, wherein the mass spectrometry device comprises:
    a vacuum cavity in which an ion source, a mass analyzer and a detector are disposed, an end of the vacuum cavity being provided with a gas inlet; and
    a vacuum pump located outside the vacuum cavity and connected to the vacuum cavity.

4. The apparatus for quantitative detection of gases of claim 3, wherein the ion source is configured to ionize the particular gas in the plurality of gases, the mass analyzer is configured to perform mass analysis on ions generated by ionization, and the detector is configured to output detection results of the mass analysis.

5. The apparatus for quantitative detection of gases of claim 4, wherein the sample processing device comprises:
    a sample processor connected with a sample tube and a mass spectrometry injection tube, wherein the sample tube also communicates with the gas outlet of the optical cavity, and the mass spectrometry injection tube also communicates with the gas inlet of the vacuum cavity.

6. The apparatus for quantitative detection of gases of claim 3, wherein the sample processing device comprises:
    a sample processor connected with a sample tube and a mass spectrometry injection tube, wherein the sample tube also communicates with the gas outlet of the optical cavity, and the mass spectrometry injection tube also communicates with the gas inlet of the vacuum cavity.

7. The apparatus for quantitative detection of gases of claim 6, wherein the sample processor comprises:
    a three-port valve having a first port communicating with the sample tube and a second port communicating with the mass spectrometry injection tube; and
    a vacuum sampling pump communicating with a third port of the three-port valve.

8. The apparatus for quantitative detection of gases of claim 6, wherein the sample processor comprises:
    a multi-way switching valve having a gas inlet communicating with the sample tube and a gas outlet communicating with the mass spectrometry injection tube; and
    a vacuum sampling pump, a carrier gas device and a quantitative loop respectively communicating with the multi-way switching valve;
    wherein the multi-way switching valve is switchable between a first state in which the quantitative loop communicates with the gas inlet of the multi-way switching valve and the vacuum sampling pump and a second state in which the quantitative loop communicates with the carrier gas device and the gas outlet of the multi-way switching valve.

9. The apparatus for quantitative detection of gases of claim 8, wherein
    in the first state, the gas inlet of the multi-way switching valve, the quantitative loop, and the vacuum sampling pump communicate in sequence, and the carrier gas device communicates with the gas outlet of the multi-way switching valve; and
    in the second state, the gas inlet of the multi-way switching valve communicates with the vacuum sampling pump, and the carrier gas device, the quantitative loop, and the gas outlet of the multi-way switching valve communicate in sequence.

10. A method for quantitative detection of gases, comprising:
    determining, by a cavity ring-down spectroscopy device, a first content of a particular gas of a plurality of gases;
    splitting the plurality of gases to enter a mass spectrometry device by a sample processing device;
    determining, by the mass spectrometry device, a ratio of respective ion signals of a different gas of the plurality of gases and the particular gas; and determining, by the mass spectrometry device, a second content of the different gas using the first content and the ratio.

11. The method for quantitative detection of gases of claim 10, wherein determining the ratio includes ionizing the particular gas and the different gas.

\* \* \* \* \*